(12) United States Patent
Lotter et al.

(10) Patent No.: US 9,237,533 B2
(45) Date of Patent: Jan. 12, 2016

(54) DETECTING UPLINK REPEATER CAPACITY

(71) Applicant: Nextivity, Inc., San Diego, CA (US)

(72) Inventors: Michiel Petrus Lotter, San Diego, CA (US); Ian Riphagen, San Diego, CA (US)

(73) Assignee: Nextivity, Inc., San Diego, CA (US)

( * ) Notice: Subject to any disclaimer, the term of this patent is extended or adjusted under 35 U.S.C. 154(b) by 0 days.

(21) Appl. No.: 14/705,796

(22) Filed: May 6, 2015

(65) Prior Publication Data

US 2015/0327190 A1 Nov. 12, 2015

Related U.S. Application Data

(60) Provisional application No. 61/989,391, filed on May 6, 2014.

(51) Int. Cl.
*H04W 52/46* (2009.01)
*H04W 24/08* (2009.01)
*H04W 72/04* (2009.01)

(52) U.S. Cl.
CPC .............. *H04W 52/46* (2013.01); *H04W 24/08* (2013.01); *H04W 72/0473* (2013.01)

(58) Field of Classification Search
CPC . H04W 24/08; H04W 52/46; H04W 72/0473; H04B 7/145–7/15592
USPC ......................................... 455/7–10; 370/315
See application file for complete search history.

(56) References Cited

U.S. PATENT DOCUMENTS

2004/0166802 A1 8/2004 McKay et al.
2012/0257532 A1 10/2012 Nakada

FOREIGN PATENT DOCUMENTS

GB 2502143 A 11/2013

*Primary Examiner* — Raymond Dean
(74) *Attorney, Agent, or Firm* — Mintz Levin Cohn Ferris Glovsky and Popeo, P.C.

(57) ABSTRACT

Systems, methods, and articles are provided for detecting uplink repeater capacity within a wireless network. Algorithms are used to determine when an out of power error condition is present to help minimize service quality issues.

16 Claims, 3 Drawing Sheets

DETECTING UPLINK REPEATER CAPACITY

CROSS-REFERENCE TO RELATED APPLICATIONS

This application claims priority to and the benefit of U.S. Provisional Application No. 61/989,391, filed May 6, 2014, which is incorporated herein by reference in its entirety.

TECHNICAL FIELD

The subject matter described herein relates to wireless networks, and more particularly to systems and techniques for detecting capacity of an uplink repeater.

BACKGROUND

The number of simultaneous users a repeater forming part of a wireless network can support is often determined by the amount of uplink transmit signal power that is available at the donor antenna of the repeater. In the case of a CDMA or UMTS systems for example, all users that have active transmissions must share the available uplink power. If the users require more uplink power than is available, the transmission from the users cannot reach the base station and this may result in dropped calls or very poor uplink data throughput.

What makes this issue particularly acute is the fact that the user may see 5 bars on his phone's signal strength indicator and yet his calls cannot go through. This is due to the fact that in the downlink direction, the user may be closer to the server antenna and hence is receiving a strong signal at the input to his phone. When this condition occurs, it is not possible to deliver a good quality of user experience to the end user and furthermore, this leads to an increase in support calls to the mobile operator or repeater vendor.

SUMMARY

In one aspect, a system and method are disclosed that can be used to detect capacity of an uplink repeater. One aspect of the present disclosure relates to a method for detecting uplink repeater capacity within a wireless network. The method may be performed on a computer have at least one processor. The method may comprise, determining, by the at least one processor, the maximum gain of the server antenna in a downlink direction. The determination may be performed in response to transmissions in the uplink direction being turned off.

The uplink transmission power level at an input to the server antenna of the repeater may be measured. In some implementations, measuring the uplink transmission power level at the server input provides an indication whether the uplink is active. Responsive to a determination that the uplink is inactive, the step of measuring the uplink transmission power level at the server input may be repeated.

The uplink transmission power level at an input to the donor antenna of the repeater may be measured. The at least one processor may be configured to determine whether the uplink transmission power level measured at the donor input is greater than, or equal to, the maximum uplink power level.

The uplink gain may be calculated. The uplink gain may be based on the difference between the uplink transmission power level at the donor input and the uplink transmission power level at the server input.

A determination may be made as to whether the calculated uplink gain is less than the maximum gain in a downlink direction. In response to a determination that the calculated uplink gain is less than the maximum gain in the downlink direction, a notification of a power error condition may be generated.

In response to the notification that there is a power error condition, the repeater may be configured to disable the antennas. In response to the notification that there is a power error condition, the power allocated to the uplink transmission may be increased.

Responsive to a determination that the uplink transmission power level measured at the donor input is less than the maximum uplink power level, the method further comprises repeating the step of measuring the uplink transmission power level at the server input.

Responsive to a determination that the uplink gain is greater than, or equal to, the downlink gain, the method may further comprise repeating the step of measuring the uplink transmission power level at the server input.

In some implementations the notification of the power error condition may be outputted.

Another aspect of the disclosure is a repeater for retransmitting wireless data signals. The repeater may include a server input configured to receive and transmit signals between the repeater and one or more wireless devices. The transmitted signals may include uplink transmissions and downlink transmissions. The server input may comprise a sensor configured to measure the transmission power of the uplink transmissions at the server input.

The repeater may include a donor input configured to receive and transmit signals between the repeater and a base station. The transmitted signals may include uplink transmissions and downlink transmissions. The donor input may comprise a sensor configured to measure the transmission power level of the uplink transmissions at the donor input.

The repeater may include at least one physical computer processor. The physical computer processor may be configured to determine the maximum gain of the server antenna at the server input. Such determination may be performed in response to a transmission in the uplink direction being turned off. A determination may be made as to whether the uplink transmission power level at the donor input is greater than, or equal to, a maximum uplink power level at the server input. The uplink gain may be calculated based on the difference between the uplink transmission power level at the donor input and the uplink transmission power level at the server input.

A determination may be made as to whether the calculated uplink gain is less than the maximum gain in a downlink direction at the server input. Responsive to a determination that the calculated uplink gain is less than the maximum gain in the downlink direction, a notification of a power error condition may be generated.

Implementations of the current subject matter can include, but are not limited to, systems and methods consistent including one or more features are described as well as articles that comprise a tangibly embodied machine-readable medium operable to cause one or more machines (e.g., computers, mobile communication devices, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claim. While certain features of the currently disclosed subject matter are described for illustrative purposes in relation to an enterprise resource software system or other business software solution or architecture, it should be readily understood that such features are not intended to be limiting. The claim that follows this disclosure is intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. A brief description of the drawings can be found below.

DETAILED DESCRIPTION

To address these and potentially other issues with currently available solutions, methods, systems, articles of manufacture, and the like consistent with one or more implementations of the current subject matter can, among other possible advantages, provide a system and method to detect uplink repeater capacity. In particular, the current subject matter describes an algorithm that can detect when the condition described above in the background happens and allows the repeater to take appropriate action to deal with this condition. Such actions can include shutting down the repeater or temporarily disabling the repeater. Or, if possible, more power can be allocated to the uplink transmission to eliminate the condition.

Figure 1:
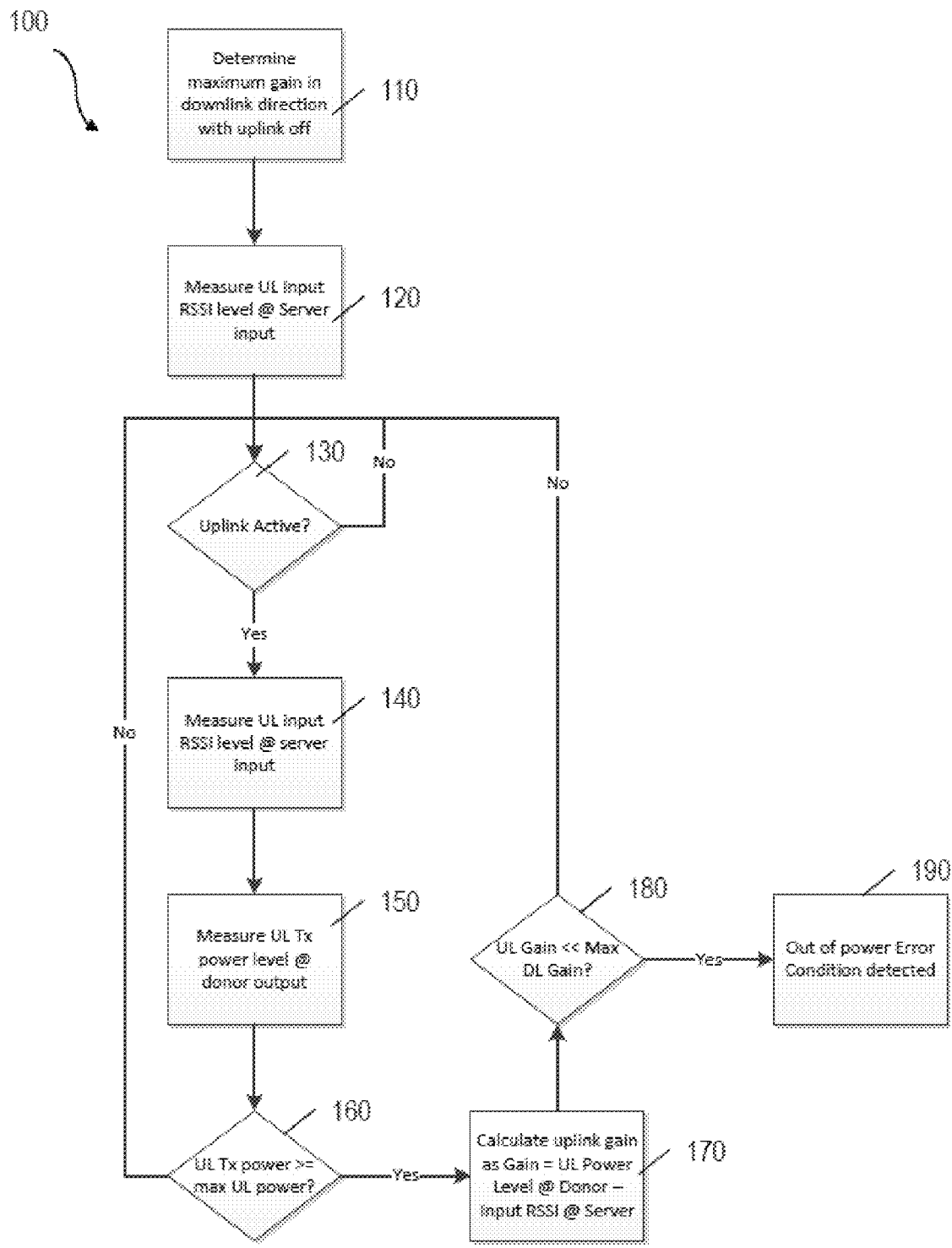
FIG. 1 illustrates an algorithm for determining uplink repeater capacity, the algorithm having one or more features consistent with aspects of the presently described subject matter.

In order to detect the condition where the repeater cannot guarantee the uplink transmission, the algorithm in diagram 100 of FIG. 1 may be utilized. The functionality described herein with respect to FIG. 1 may be performed by components of the repeater system. The repeater system may include a processor and/or other components configured to perform the functionality of the algorithm in diagram 100. Some of the components are described with reference to FIGS. 2 and 3, below.

At 110, a maximum gain of the server antenna in a downlink direction can be determined. The maximum gain in a downlink direction may be determined, responsive to the uplink being inactive. Gain may relate to the antenna's directivity and electrical efficiency. For a transmitting antenna, the amount of gain describes how well the antenna can convert input power into radio waves headed in a specified direction. For a receiving antenna, the amount of gain describes how well the antenna can convert radio waves from a specified direction into electrical power. The determination of the maximum gain of the server antenna may be performed by one or more physical computer processors, as described below with respect to FIGS. 2 and 3.

At 120 the power present in the radio signals received at the server antenna may be measured. Such power may include the uplink received signal strength indication (RSSI) level. Such power level may be measured at the server input. The measurement of the uplink transmission power level at the server input may be performed by one or more sensors and/or other components of the repeater system.

At 130, a determination may be made as to whether the uplink is active. This determination may be based on the transmission power level measured at 120. In response to a determination that the uplink is inactive, the determination, or an attempt to determine, may be repeated until such determination is made.

At 140, in response to a determination at 130 that the uplink is active, the power present in the radio signals received at the server antenna may be again measured.

At 150, the power present in the radio signals received at the donor antenna may be measured. Such measurement may be performed at the donor input of the repeater. Such power measurement may include the uplink RSSI level at the donor input.

At 160, a determination may be made as to whether the uplink transmission power level is greater than, or equal to, the maximum uplink transmission power level. If this is not the case, then the process may loop back to determine, at 130, whether the uplink is active. Otherwise, if it is determined that the uplink transmission power is greater than or equal to the maximum uplink power (at 160), then, at 170, the uplink gain may be calculated. The uplink gain may equal the difference between the RSSI level at the donor input and the RSSI level at the server input.

At 180, a determination may be made as to whether the calculated uplink gain is less/significantly less than the maximum downlink gain. If that is the case, then, at 190, an out of power error condition is detected. Otherwise, the process loops back to determine, at 130, whether the uplink is active.

Various corrective actions can be taken if an out of power error condition is detected such as shutting down the repeater or temporarily disabling the repeater. Or, if possible, more power can be allocated to the uplink transmission to eliminate the condition.

Figure 2:
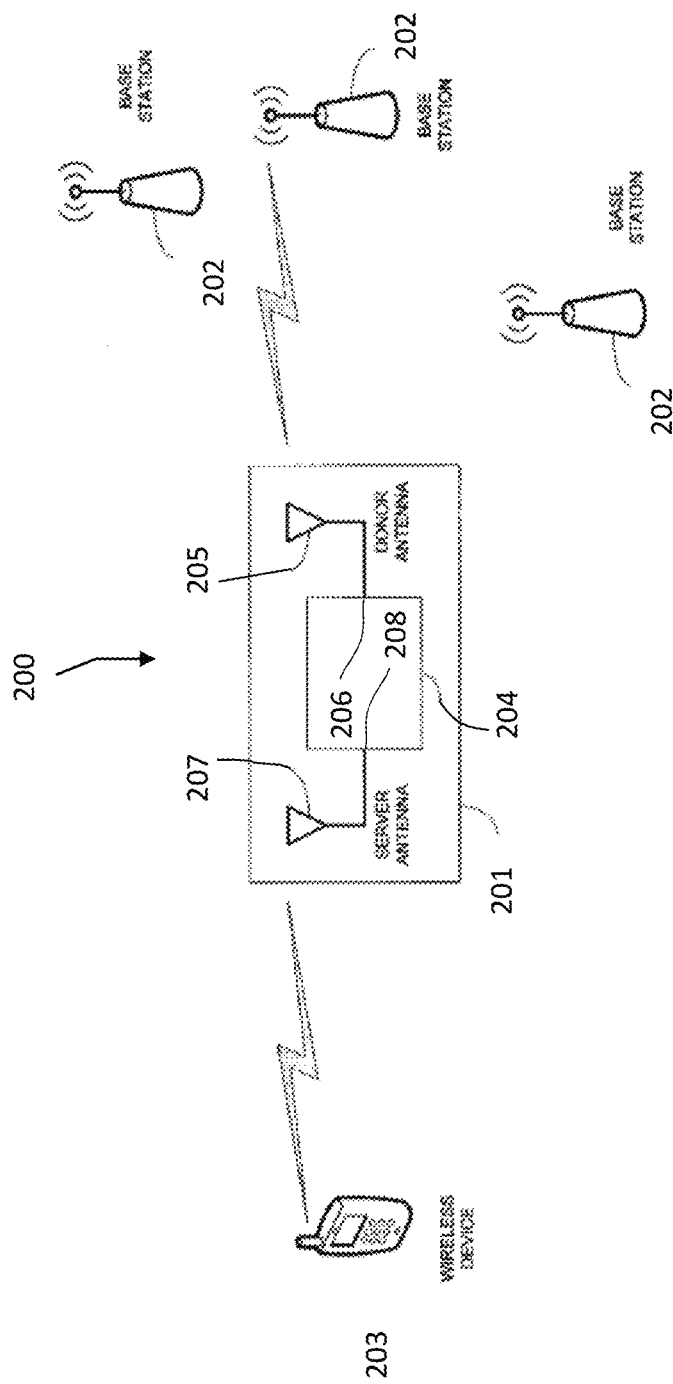
FIG. 2 is an illustration of a repeater system for facilitating the repeating of wireless signals having one or more features consistent with aspects of the presently described subject matter; and, FIG. 3 is an illustration of a system for determining uplink repeater capacity having one or more features consistent with aspects of the presently described subject matter.

FIG. 2 is an illustration of a repeater system 200 for facilitating the repeating of wireless signals having one or more features consistent with aspects of the presently described subject matter. While FIG. 2 illustrates a cellular repeater system 200, it is intended to be illustrative only. The present description is applicable to any type of repeater used for any type of purpose. The algorithms and systems herein described would be applicable for both long-range and short-range systems.

The repeater system 200 may include a repeater 201. The repeater 201 may be configured to receive relatively weak signals from a base station(s) 202, amplify the signals received from the base station(s) 202, and retransmit them for the benefit of one or more wireless devices 203. The repeater 201 may include a processor 204. The processor 204 will be referred to in greater detail below with respect to FIG. 3.

The repeater 201 may include a donor antenna 205. The donor antenna 205 may be adapted to communicate with one or more base stations 202. The donor antenna 205 may be electronically connected with the repeater 201 through a donor input 206. The repeater 201 may include a server antenna 207. The server antenna 207 may be adapted to communicate with a wireless device 203. The server antenna 207 may be electronically connected with the repeater 201 through a server input 208. Examples of the wireless device 203 include a cellular phone, laptop computer, desktop computer, personal digital assistant (PDA), tablet, smartphone, or any wireless device. In some configurations, the repeater 201 may be suited for an environment such as a home or building, to receive signals from the selected base station 202, boost, or add gain to, the signals, and send the boosted signals to the wireless device 203, and back again from the wireless device 203 to the selected base station 202.

Figure 3:
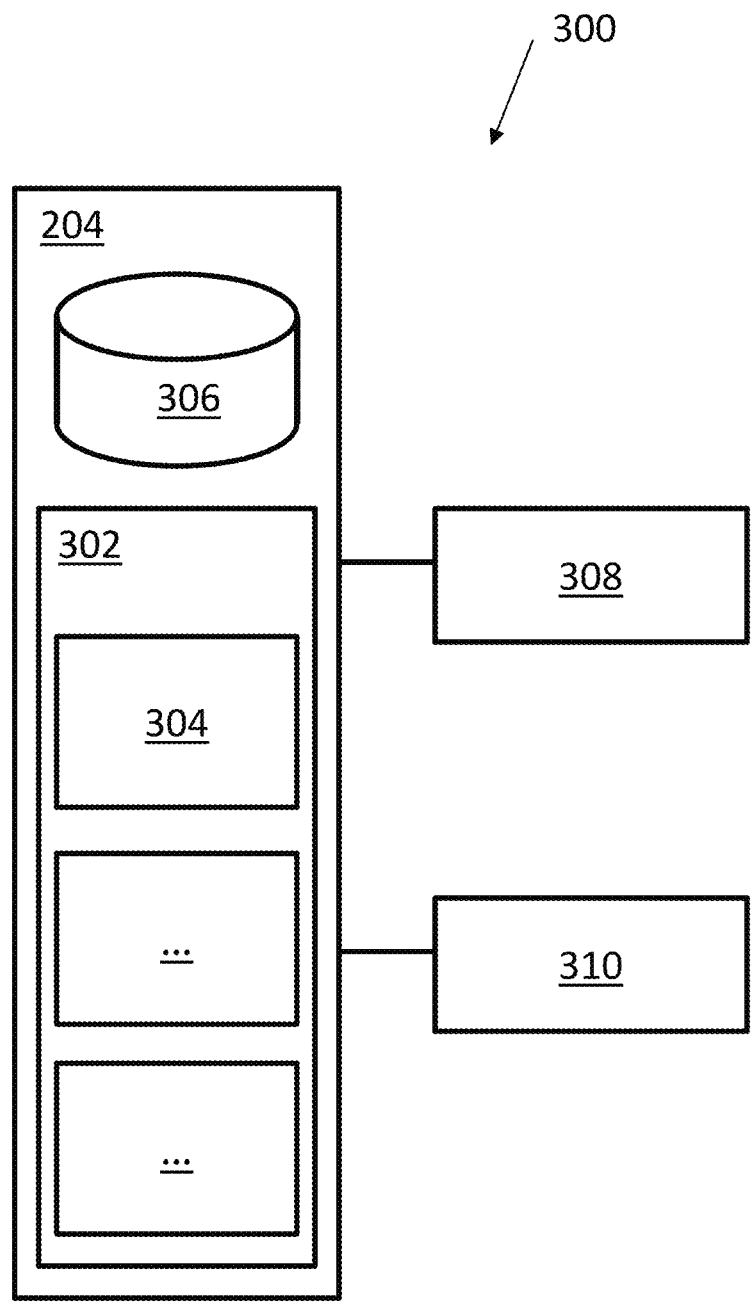

The repeater 201 may be configured to process the signals transmitted through it, measure one or more parameters associated with the signals, process the signals to determine characteristics of the signals, and/or perform other functions. FIG. 3 is an illustration of an example of a system 300 that may be included in repeater 201 to facilitate the operations of the repeater 201.

The system 300 may comprise one or more physical processors 302. The one or more physical processors 302 may be configured to execute computer program instructions. The one or more physical processors 302 may be configured to execute the computer program instructions via one or more of hardware, software, and/or firmware. Although system 300 may be described in certain sections herein as including one or more physical processors 302 that are collocated, and configured to execute one or more computer program instructions 304, this is not intended to be limiting. The functionality attributable to the processor(s) 302 and/or the processor 204 may be attributable to multiple processors and/or other components. In some implementations, such other processors and/or components may be physically and logically separated. For example, some of the functionality described herein with respect to the repeater 201 may be attributable to the wireless devices 203. Any given wireless device may include one or more processors capable of executing one or more computer program instructions. The wireless devices 203 may be configured to handle some of the computations and determinations described herein. The wireless device(s) 203 may be configured to transmit the results and/or outputs of such computations and determinations to the repeater 201.

The processor(s) 302 may be configured to execute computer program instructions, such as computer program instructions 304. Computer program instructions 304 are represented here as discrete elements associated with processor 302, but this is not intended to be limiting. The discrete elements for computer program instructions 304 is provided in FIG. 3 for ease of representation only, and the present disclosure contemplates any format or arrangement of computer program instructions 304. The functionality described herein may be provided by discrete computer program modules and/or components, or may be provided by continuous uninterrupted code, or by any other arrangement of computer program instructions. The computer program instructions 304 may be stored in electronic storage media, such as electronic storage media 306. In other implementations, the computer program instructions 304 may be coded into the processors and/or components themselves.

Electronic storage 306 may comprise electronic storage media that electronically stores information. The electronic storage media of electronic storage 306 may include one or both of system storage that is provided integrally (i.e., substantially non-removable) with processor 204 and/or removable storage that is removably connectable to processor 204 via, for example, a port (e.g., a USB port, a firewire port, etc.) or a drive (e.g., a disk drive, etc.). Electronic storage 306 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 306 may include one or more virtual storage resources (e.g., cloud storage, a virtual private network, and/or other virtual storage resources). Electronic storage 306 may store software algorithms, information determined by processor 302 information received at processor 204 and/or other information that enables processor 302 to function as described herein.

Processor(s) 302 is configured to provide information processing capabilities in repeater 201. As such, processor 302 may include one or more of a digital processor, an analog processor, a digital circuit designed to process information, an analog circuit designed to process information, a state machine, and/or other mechanisms for electronically processing information. Although processor 302 is shown in FIG. 3 as a single entity, this is for illustrative purposes only. In some implementations, processor 302 may include a plurality of processing units.

The processor(s) 302 and/or 204 may be in electronic communication with one or sensors. Such sensors may include donor input sensor 308 and sever antenna 310. Donor input sensor 308 may be configured to measure the uplink and/or downlink transmission power level at a donor input 206. Server input sensor 310 may be configured to measure the uplink and/or downlink transmission power level at a server input 208. Donor input sensor 308 and server input sensor 310 may be separate sensors or may be a single sensor providing the functionality of both the donor input sensor 308 and the server input sensor 310. The functionality of donor input sensor 308 and server input sensor 310 may be provided by processor 302, and/or other components within system 200, as shown in FIG. 2. Donor input sensor 308 and server input sensor 310 may be hardware, software and/or firmware components.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for detecting uplink capacity of a repeater within a wireless network, the repeater having a server antenna and a donor antenna, the method performed on a computer have at least one processor, the method comprising:
   determining, by the at least one processor, the maximum gain of the server antenna in a downlink direction, the determination performed in response to transmissions in the uplink direction being turned off;
   measuring the uplink transmission power level at an input to the server antenna of the repeater;
   measuring the uplink transmission power level at an input to the donor antenna of the repeater;
   determining, by the at least one processor, whether the uplink transmission power level measured at the donor input is greater than, or equal to, the maximum uplink power level;
   calculating, by the at least one processor, the uplink gain based on the difference between the uplink transmission power level at the donor input and the uplink transmission power level at the server input;
   determining, by the at least one processor, whether the calculated uplink gain is less than the maximum gain in a downlink direction; and,
   generating, responsive to a determination that the calculated uplink gain is less than the maximum gain in the downlink direction, a notification of a power error condition.

2. The method as in claim 1, further comprising:
   disabling the repeater in response to the generated notification of a power error condition.

3. The method as in claim 1, further comprising:
   increasing the power allocated to the uplink transmission in response to the generated notification of a power error condition.

4. The method of claim 1, wherein measuring the uplink transmission power level at the server input provides an indication whether the uplink is active.

5. The method of claim 4, wherein, responsive to a determination that the uplink is inactive, repeating the step of measuring the uplink transmission power level at the server input.

6. The method of claim 4, wherein responsive to a determination, by the at least one processor, that the uplink transmission power level measured at the donor input is less than the maximum uplink power level, the method further comprises repeating the step of measuring the uplink transmission power level at the server input.

7. The method of claim 1, wherein responsive to a determination, by the at least one processor, that the uplink gain is greater than, or equal to, the downlink gain, the method further comprises repeating the step of measuring the uplink transmission power level at the server input.

8. The method of claim 1, further comprising:
   outputting the notification of the power error condition.

9. A repeater for retransmitting wireless signals comprising:
   a server input configured to receive and transmit signals between the repeater and one or more wireless devices, the transmitted signals including uplink transmissions and downlink transmissions, the server input comprising a sensor configured to measure the transmission power of the uplink transmissions at the server input;
   a donor input configured to receive and transmit signals between the repeater and a base station, the transmitted signals including uplink transmissions and downlink transmissions, the donor input comprising a sensor configured to measure the transmission power level of the uplink transmissions at the donor input; and,
   at least one physical computer processor configured to:
      determine the maximum gain of the server antenna at the server input, the determination performed in response to a transmission in the uplink direction being turned off;
      determine whether the uplink transmission power level at the donor input is greater than, or equal to, a maximum uplink power level at the server input;
      calculate the uplink gain based on the difference between the uplink transmission power level at the donor input and the uplink transmission power level at the server input;
      determine whether the calculated uplink gain is less than the maximum gain in a downlink direction at the server input; and,
      generate, responsive to a determination that the calculated uplink gain is less than the maximum gain in the downlink direction, a notification of a power error condition.

10. The repeater as in claim 9, wherein the at least one physical computer processor is further configured to disable the repeater in response to a notification of a power error condition.

11. The repeater as in claim 9, wherein the further at least one physical computer processor is further configured to increase the power allocated to the uplink transmission in response to a notification of a power error condition.

12. The repeater as in claim 9, wherein measuring the uplink transmission power level at the server input provides an indication whether the uplink is active.

13. The repeater as in claim 12, wherein, responsive to a determination that the uplink is inactive, the at least one physical computer processor is further configured to repeat the step of measuring the uplink transmission power level at the server input.

14. The repeater as in claim 12, wherein, responsive to a determination that the uplink transmission power level measured at the donor input is less than the maximum uplink power level, the at least one physical computer processor is further configured to repeat the step of measuring the uplink transmission power level at the server input.

15. The repeater as in claim 9, wherein, responsive to a determination that the uplink gain is greater than, or equal to, the downlink gain, the at least one physical computer processor is further configured to repeat the step of measuring the uplink transmission power level at the server input.

16. The repeater as in claim 9, wherein, responsive to generation of a notification of a power error condition, the one or more physical computer processors may be further configured to output the notification.

* * * * *